April 10, 1962   S. A. MURDOCK   3,029,219
GRAFT COPOLYMERS COMPRISED OF MONOMERIC VINYL BENZYL
POLYGLYCOL ETHERS ON POLYVINYLLACTAMS, ACRYLONITRILE
POLYMER COMPOSITIONS OBTAINABLE THEREWITH, AND
METHOD OF PREPARATION
Filed Nov. 25, 1957

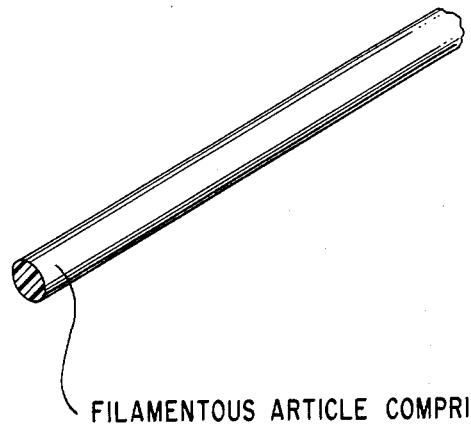

FILAMENTOUS ARTICLE COMPRISED OF AN
ACRYLONITRILE POLYMER HAVING A GRAFT CO-
POLYMER OF A MONOMERIC VINYL BENZYL POLY-
GLYCOL ETHER GRAFT COPOLYMERIZED UPON A
VINYL LACTAM POLYMER INCORPORATED THEREIN.

*INVENTOR.*
STANLEY A. MURDOCK

BY

*Griswold & Burdick*
ATTORNEYS

3,029,219
GRAFT COPOLYMERS COMPRISED OF MONOMERIC VINYL BENZYL POLYGLYCOL ETHERS ON POLYVINYLLACTAMS, ACRYLONITRILE POLYMER COMPOSITIONS OBTAINABLE THEREWITH, AND METHOD OF PREPARATION
Stanley A. Murdock, Concord, Calif., assignor to The Dow Chemical Company, Midland, Mich., a corporation of Delaware
Filed Nov. 25, 1957, Ser. No. 698,771
28 Claims. (Cl. 260—45.5)

The present invention resides in the general field of organic chemistry and contributes specifically to the polymer art, especially with respect to certain graft copolymer compositions and fiber-forming polymer blends obtainable therewith. It is particularly concerned with graft copolymers of certain monomeric vinyl benzyl polyglycol ethers that are graft copolymerized upon polyvinyllactams, which graft copolymers have especial utility as dye-receptive, antistatic and stabilizing additaments for acrylonitrile polymer compositions which, advantageously, may be of the fiber-forming variety. The invention is also concerned with the compositions that may be obtained by blending the graft copolymers with acrylonitrile polymers, as well as with shaped articles which have been fabricated from such compositions and which, as a consequence, have significantly enhanced properties and characteristics as regards improvements in and relating to enhanced dye-receptivity, minimized inherent propensity to accumulate electrostatic charges, natural stability to various deteriorating influences, including stability against becoming deleteriously influenced and degraded upon exposure to heat at elevated temperatures and to light. Within the scope and purview of the invention, there is comprehended (1) the various novel and utile graft copolymers of the indicated variety; (2) the advantageous polymer compositions, particularly fiber-forming compositions, obtained by blending the graft copolymers with acrylonitrile polymers; (3) various shaped articles fabricated from and comprised of the graft copolymer-containing acrylonitrile polymer compositions; and (4) methods for the preparation of the above-indicated compositions.

It is the main purpose and primary design of the present invention to provide and make available graft copolymers of certain monomeric vinyl benzyl polyglycol ethers upon vinyl lactam polymers that are especially well suited for being incorporated in acrylonitrile polymer compositions, particularly compositions of polyacrylonitrile, to serve in the indicated treble capacity of dye-assisting adjuvants, antistatic agents and stabilizing ingredients. It is also a principal aim and chief concern of the invention to provide and make available acrylonitrile polymer compositions and shaped articles therefrom that contain the above-indicated and hereinafter more fully delineated type of graft copolymeric additaments which compositions have, as intrinsic distinguishing characteritics, excellent receptivity of and acceptability for any of a wide variety of dyestuffs; permanently imbued antistatic properties that are usually good for and not commonly encountered in polymeric materials of the synthetic, essentially hydrophobic varieties of such substances; and efficacious natural stability to heat and light, as well as to certain chemical conditions, such as alkaline environments.

The graft copolymers of the present invention which have the indicated capacity and utility as additaments for acrylonitrile polymer compositions are comprised of a polyvinyllactam trunk or base upon which there is graft copolymerized certain monomeric vinyl benzyl polyglycol ethers of the variety hereinafter described. Advantageously, the graft copolymers may also be prepared from mixtures of the referred to monomeric polyglycol ethers with mixtures of certain monomeric, vinyl or other alkenyl group-containing organic sulfonic acids or derivatives thereof, also hereinafter more fully delineated.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 percent by weight of polymerized acrylonitrile which, preferably, is of the fiber-forming variety and, most advantageously, is polyacrylonitrile and (B) a minor proportion of the above-indicated variety of beneficial graft copolymeric additament that functions in the described manner.

The methods of the invention by which the herein contemplated advantageous compositions may be made involve preparation of the graft copolymer, as well as incorporation of a minor proportion of the graft copolymer product as a beneficial additament in and with the acrylonitrile polymer base by any of several beneficial techniques, hereinafter more thoroughly defined, adapted to suitably accomplish the desired result.

Without being limited to or by the specific embodiments and modes of operation set forth, the invention is illustrated in and by the following didactic examples wherein, unless otherwise indicated, all parts and percentages are to be taken on a weight basis.

EXAMPLE A

Into a 500 ml. reactor that was equipped with an efficient agitator, a nitrogen sparger, and a total reflux condenser, there was charged about 31.5 grams of poly-N-vinyl-2-pyrrolidone (PVP) having a Fikentscher K-value of about 45; about 7.2 grams of monomeric 1-(2-methoxyethoxy)-2(vinylbenzyloxy)ethane; about 6.3 grams of sodium styrene sulfonate; about 0.5 grams of potassium persulfate; and about 181.8 grams of water. The resulting mixture was brought to a pH of about 6 by acidification with hydrochloric acid. Under continued nitrogen sparging and with continued stirring, the acidified reaction mass was maintained at a temperature of about 60° C. over a 19 hour period. At the end of this time, the reaction was terminated. About 75.5 percent of the monomers were found to have been converted to graft copolymeric product which was obtained as white emulsion of the graft copolymer, containing about 19.8 percent of the water-insoluble graft copolymer solids dispersed in water. Upon analysis, the graft copolymeric product was found to contain about 14 percent of polymerized polyglycol ether monomer units; 11 percent of polymerized sodium styrene sulfonate units; and about 75 percent of PVP.

Polyacrylonitrile fibers containing about 10 percent of the above copolymer product were prepared by impregnating filamentary structures that were in aquagel condition (after having been salt-spun and wet-stretched) in and with an aqueous dispersion of the copolymer that contained about 1.5 percent of the graft copolymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contained about 43 percent of dissolved zinc chloride to form a multiple filament tow. After being spun, the tow bundle of coagulated polyacrylonitrile aquagel fiber was washed substantially free from salt upon being withdrawn from the coagulating bath and then wet-stretched for orientation to a total stretched length that was about thirteen times its original extruded length. The aquagel fiber containing about two parts of water for each part of polymer therein, was then passed through the mentioned aqueous impregnating bath of the dissolved copolymer additive so as to become impregnated therewith to the indicated extent.

Following the impregnation, the aquagel fiber was irreversibly dried at 150° C. to destroy the water-hydrated structure and convert it to a finished fiber form. The finally obtained 3 denier fiber product had a tenacity of about 4.0 grams per denier, an elongation of about 29 percent and a wet yield strength of about 0.90 grams per denier. The copolymer-containing acrylonitrile polymer fiber product was found to have excellent natural stability to heat and light as well as against becoming degraded under the influence of aqueous alkaline media at pH levels as high as 10. It was found to be nearly free of propensity to accumulate charges of static electricity upon handling.

In addition, the graft copolymer-containing sample had good color and hand and was dyeable with all classes of dyestuffs as applied under normal dyeing conditions.

The fiber product dyed well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL was performed at the 4 percent level according to conventional procedure in which the fiber sample was maintained for about one hour at the boil in the dye bath which contained the dyestuff in an amount equal to about 4 percent of the weight of the fiber. The dye bath also contained sodium sulfate in an amount equal to about 15 percent of the weight of the fiber and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from 0 to 100 was thereby obtained. This value represented the relative comparison of the amount of light that was reflected from a standard white tile reflector that had a reflectance value of 316 by extrapolation from the 0-100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product was about 20.

The antistatic properties of the copolymer-containing fiber were then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on a common basis, the conductivities of the samples tested were actually measured as volume resistivities according to the following formula:

Volume resistivity $$= \frac{(\text{Resistance})(\text{cross-sectional area})}{\text{Path length between electrodes to which sample being tested is attached}}$$

The units of volume resistivity are ohm-cm.$^2$/cm.

Prior to being tested, the graft copolymer-containing polyacrylonitrile fiber prepared in the indicated manner was vat dyed in the conventional manner with Cibanone Green BF Dbl. Paste (Colour Index Vat Green No. 1). A portion of the vat dyed sample was then subjected to five (5) consecutive No. 3-A accelerated wash tests in accordance with the American Association of Textile Chemists and Colorists (AATCC) Manual. The actual resistivities of the merely vat dyed sample as well as that of the sample that had been both vat dyed and scoured were then determined (after the samples being tested were conditioned for seventy-two hours at the particular temperature and relative humidity conditions involved in each of the tests) by tautly connecting a web-like sample of the yarn between two electrodes, each of which were 9 centimeters long spaced parallel 13 centimeters apart, and across which there was applied a 900 volt direct current potential. For purposes of comparison, the volume resistivities of cotton, wool and an unmodified polyacrylonitrile fiber (obtained in the same way as the copolymer-containing fiber but without having the polymeric additament incorporated therein) were also tested in the indicated manner along with the graft copolymer-containing fiber in accordance with the present invention.

The results are set forth in the following tabulation which indicates the volume resistivities obtained at various relative humidities (RH) at 23° C. of each of the samples tested.

Table 1.—*Volume Resistivities of Various Fiber Samples Compared to Polyacrylonitrile Fibers Impregnated With Graft Copolymer of Monomeric Vinyl Benzyl Polyglycol Ether and Sodium Styrene Sulfonate on PVP*

| Sample | Volume Resistivity, ohm-cm.$^2$/cm. | |
|---|---|---|
| | 47 percent RH | 66 percent RH |
| Graft Copolymer-containing fiber as made | $1.5 \times 10^{10}$ | $8 \times 10^8$ |
| Graft Copolymer-containing fiber as scoured | $1.8 \times 10^{10}$ | $1.5 \times 10^9$ |
| Scoured cotton | $3.0 \times 10^7$ | $5.4 \times 10^6$ |
| Scoured wool | $1.9 \times 10^{10}$ | $3.3 \times 10^9$ |
| Scoured unmodified polyacrylonitrile | $5 \times 10^{12}$ | $1.2 \times 10^{12}$ |

As is apparent in the foregoing, the graft copolymer-containing sample, even after being severely scoured, had electrical conductance properties much superior to ordinary polyacrylonitrile and only slightly poorer than cotton. At the same time, the physical properties of the copolymer-containing fiber were excellent, being about equal to those of the unmodified polyacrylonitrile fiber.

EXAMPLE B

The procedure of the first example was essentially repeated using the same monomeric vinyl benzyl polyglycol ether to prepare a straight graft copolymer with the monomer from the following charge which was also polymerized in the same way as in the first example for 19 hours at 66° C.:

|  | Grams |
|---|---|
| Monomer | 13.5 |
| PVP (K-value 45) | 31.5 |
| Water | 181.8 |
| Potassium persulfate | 0.5 |
| pH of charge | 6 |

The resulting product was obtained as a white emulsion that contained about 19.8 percent of dispersed water-insoluble graft copolymer solids. Conversion of the monomer to graft copolymer was found to be greater than 50 percent. The graft copolymer product was comprised of about 20 percent of polymerized units of the monomer on the PVP substrate.

The procedure of the first example was repeated to apply the graft copolymer product from 1.5 percent aqueous dispersion to a polyacrylonitrile aquagel fiber in order to obtain a fiber product containing about 10 percent of the graft copolymeric additament incorporated therein. The fiber product had excellent dyeability to deep and level shades of coloration with all classes of dyes excepting basic types. Its 4 percent Calcodur Pink 2BL reflectance value was about 22. The antistatic properties of the fiber were evaluated as in the first example and were found to be excellent. As made, the volume resistivities of the graft copolymer-containing fiber product were found to be about $7.0 \times 10^9$ ohm-cm.$^2$/cm. at 58 percent RH and $8.5 \times 10^8$ ohm-cm.$^2$/cm. at 66 percent RH. After a boiling scour, the volume resistivities of the fiber product containing the graft copolymer additament were found to be about $1.9 \times 10^{10}$ ohm-cm.$^2$/cm. at 58 percent RH and about $2.3 \times 10^9$ ohm-cm.$^2$/cm. at 66 percent RH. Thus, the antistatic characteristics of the fiber product were much better than that of unmodified polyacrylonitrile and compared quite favorably with wool. Its conductivity was not significantly altered by the boiling scour. In addition, as was the case with the fiber product of the first example, the stability to heat and light of the graft copolymer-containing fiber product was found to be excellent.

Similar results were also obtained when the foregoing procedure was repeated excepting to prepare the graft copolymer in a reaction mass in which dimethyl sulfoxide was employed as a solvent and azobisisobutyronitrile the catalyst. The graft copolymer prepared in the organic solvent was separated therefrom and prepared in aqueous emulsion for purposes of impregnating the acrylonitrile polymer fiber.

Excellent results may also be obtained when the foregoing is repeated to prepare graft copolymer additives from poly-N-vinylcaprolactam, poly-N-vinylpiperidone, poly-N-vinyl-5-methyl-2-pyrrolidone and other vinyl lactam polymers using the same or any other of the monomeric components indicated as being useful in the practice of the invention. Results similar to those set forth in the foregoing can likewise be obtained when the graft copolymer additaments are incorporated in polyacrylonitrile and other acrylonitrile polymer fibers to provide articles in accordance with the present invention by blending the graft copolymer and the fiber-containing acrylonitrile polymer in a spinning composition or dope prior to its extrusion into filamentary products by either wet spinning or dry spinning techniques. In such instances, incidentally, it may be desirable (in order to secure optimum benefit in the practice of the invention) to employ relatively larger quantities of the graft copolymeric additament than when surface impregnation is performed so that the presence of effective quantities of the additament at or near the peripheral portion of the article is assured.

The vinyl benzyl polyglycol ether monomers that may be employed individually or in combination with monomeric organic sulfonic acid compounds for the preparation of the graft copolymeric additaments are of the general formula:

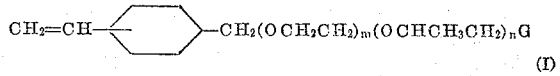

(I)

wherein G is selected from the group consisting of alkoxy radicals containing from 1 to about 8 carbon atoms (i.e., —OCH$_3$, —OC$_2$H$_5$, and other —OR groups), thioalkyl radicals containing from 1 to about 8 carbon atoms (i.e., —SCH$_3$, —SC$_2$H$_5$, and other —SR radicals) and halogens of atomic number 17 to 53 (i.e., chlorine, bromine and iodine); $m$ is the number of ethylene glycol groups having an average value from about 2 to about 40; $n$ is the number of propylene glycol groups that includes 0 and has an average value that may be as large as about 20 but is never larger than the value of $m$, and the sum of the average numerical value of $m+n$ is from about 2 to about 40. In such monomers, the ring-substituted vinyl

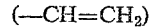

radical may be ortho, meta or para on the phenyl nucleus relative to the benzyl radical. Likewise, the monomeric product may be obtained in forms of mixtures wherein the vinyl substituent is present on the phenyl nucleus in various positions. The monomeric vinyl benzyl polyglycol ether that is employed may have a molecular weight between about 200 and 2000, advantageously from about 236 to 1200.

The sulfonic acid and derivative monomers that may advantageously be mixed with the monomeric vinyl benzyl polyglycol ethers of Formula I for preparation of certain of the graft copolymeric products that may be obtained with benefit in the practice of the invention are monomeric, vinyl or other alkenyl group-containing, organic sulfonic acid or derivatives thereof that are selected from the group of such compounds (including mixtures thereof) consisting of those represented by the formulae:

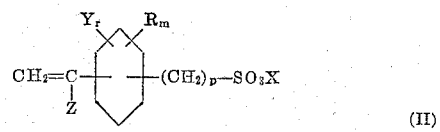

(II)

(Aromatic organic sulfonic acid compounds)

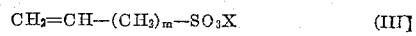

(III)

(Alkenyl organic sulfonic acid compounds)

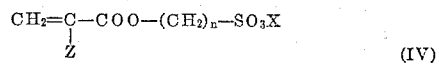

(IV)

(Sulfoalkylacrylate organic sulfonic acid compounds)

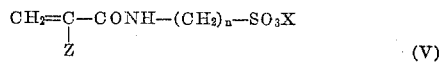

(V)

(Acryloyl taurine homolog compounds)

and

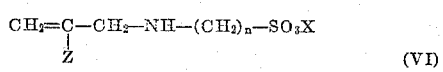

(VI)

(Allyl taurine homolog compounds)

all wherein X is hydrogen, an aliphatic hydrocarbon radical containing from 1 to 4 carbon atoms or an alkali metal ion (including sodium, potassium and lithium); Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $r$ has a numerical value of 1 to 4.

Besides those specifically illustrated herein, other organic sulfonic acids may also be utilized for the preparation of the water-insoluble copolymers of the present invention such, by way of illustration, as those which are set forth in the disclosure of United States Letters Patent No. 2,527,300. In addition to the copolymers specifically described in the foregoing examples, other water-insoluble copolymeric additaments that may advantageously be employed in the practice of the present invention include copolymers of the various heretofore delineated monomeric polyglycol ethers with such organic sulfonic acids as 2-propene sulfonic acid; sodium para-vinylbenzene sulfonate; 2- and/or 3-sulfopropyl acrylate; α-sulfoacrylic acid; sodium vinyl toluene sulfonate; potassium ortho-chlorostyrene sulfonate; 2-hydroxy-3-sulfopropyl acrylate, sodium salt; sodium 3-allyloxyl-2-hydroxypropane sulfonate; 4-sulfophenyl acrylate, sodium salt; N-allyl imino di-(2-ethane sulfonic acid); and the like, upon a (b) vinyl lactam polymer, including in particular poly-N-vinyl-2-pyrrolidone (PVP) and poly-N-vinylcaprolactam.

Still other organic sulfonic acids that may be employed are as set forth in the following representative (but by no means exhaustive) listing, wherein they are grouped according to the above-designated types:

AROMATIC ALKENYL GROUP-CONTAINING SULFONIC ACID COMPOUNDS (FORMULA II)

Para-styrene sulfonic acid
Ortho-styrene sulfonic acid
Para-isopropenyl benzene sulfonic acid
Para-vinyl benzyl sulfonic acid
Ortho-isopropenyl benzyl sulfonic acid
Sodium para-styrene sulfonate
Potassium ortho-styrene sulfonate
Methyl para-styrene sulfonate
Ethyl para-vinyl benzyl sulfonate
Ortho-vinyl benzyl sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-isopropenyl benzene sulfonic acid
3-vinyl toluene 6-sulfonic acid, sodium salt
2-ethyl-4-vinyl-benzene sulfonic acid
2,3-dichloro-4-vinyl benzene sulfonic acid
2,3,5-tribromo-4-vinyl benzene sulfonic acid
2-chloro-3-vinyl-toluene-6-sulfonic acid
2,3-diethyl-4-vinyl-benzyl sulfonate, sodium salt

ALKENYL SULFONIC ACID COMPOUNDS (FORMULA III)

Ethylene sulfonic acid
Sodium ethylene sulfonate
Potassium ethylene sulfonate
Methyl ethylene sulfonate
Isopropyl ethylene sulfonate
1-propene 3-sulfonic acid
1-propene 1-sulfonic acid, sodium salt
1-propene 2-sulfonic acid, ethyl ester
1-butylene 4-sulfonic acid, n-butyl ester
1-butylene 3-sulfonic acid
Tertiary butylene sulfonic acid

SULFOALKYLACRYLATE COMPOUNDS (FORMULA IV)

Sulfomethylacrylate
2-sulfoethylacrylate
Sulfomethylmethacrylate, sodium salt
2-sulfoethylmethacrylate, methyl ester
2-sulfoethylmethacrylate, potassium salt

ACRYLOYL TAURINE AND HOMOLOGOUS COMPOUNDS (FORMULA V)

N-acryloyl taurine
N-acryloyl taurine, sodium salt
N-methacryloyl taurine, methyl ester
N-methacryloyl taurine, potassium salt
N-acryloyl taurine, ethyl ester
N-acryloyl-aminomethane sulfonic acid
N-methacryloyl-aminomethane sulfonic acid, sodium salt
Methyl N-methacryloyl-aminomethane sulfonate

ALLYL TAURINE AND HOMOLOGOUS COMPOUNDS (FORMULA VI)

Allyl taurine
Allyl taurine, sodium salt
Allyl taurine, potassium salt
Methallyl taurine
Methallyl taurine, methyl ester
Methallyl taurine, isopropyl ester
N-allyl-aminomethane sulfonic acid
Sodium N-allyl-aminomethane sulfonate
Lithium N-methallyl-aminomethane sulfonate
n-Butyl N-allyl-aminomethane sulfonate The vinyl lactam polymers that are utilized in the preparation of the graft copolymeric additaments of the present invention may be any of those (or their mixtures) which are variously characterized and generically known to the art as poly-N-vinyl lactams or poly-1-vinyl lactams. Such polymers as have been described or which may be prepared from the mentioned varieties of monomers that are involved in U.S. Patents Nos. 2,265,450; 2,371,804; and 2,335,454 may be suitably employed in the practice of the invention. Advantageously, as has been indicated, the poly-N-vinyl lactams that are employed are poly-N-vinyl-2-pyrrolidone or poly-N-vinylcaprolactam, particularly the former. Beneficially, although not in a limiting sense, the poly-N-vinyl lactam that is employed may have a Fikentscher K-value from about 25 to 55 or so.

The graft copolymers of the present invention may generally be prepared by methods of polymerization, such as those which have been demonstrated in the foregoing illustrative examples, that employ such polymerization catalysts as persulfates, organic and inorganic peroxide and azo type materials in quantities that are conventional for such uses. The graft copolymers may oftentimes be prepared by polymerizing the monomeric constituent onto the vinyl lactam polymer under the influence of high energy irradiation such as by means of X-rays and the like. The graft copolymers may be prepared in both aqueous and organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 10 to 60 hours.

The compositions of the graft copolymeric additaments that are employed can vary within relatively wide limits. The content of the monomeric constituent, whether it is the monomeric vinyl benzyl polyglycol ether being individually employed or in combination with the monomeric organic sulfonic acid compounds, may advantageously be between about 20 and 80 percent by weight of a graft copolymer, with the polyvinyllactam substrate consisting of the remaining 80 to 20 percent of the polymeric product. In many cases, especially to secure optimum dye-receptivity, nearly equivalent or about commensurate proportions of the graft copolymerized monomeric constituent and the vinyl lactam polymer substrate upon which it is graft copolymerized may be employed for the preparation of the graft copolymeric additaments. When the monomeric vinyl benzyl polyglycol ether is employed in mixtures with monomeric organic sulfonic acid compounds for preparation of the graft copolymer products, either of the diverse type of monomers may be present in the mixture in proportions of from about 10 to 90, advantageously from about 30 to 70 mole percent of either monomer. Thus, a mixture of a vinyl benzyl polyglycol ether monomer with an organic sulfonic acid monomer can advantageously contain from 10 to 90 mole percent of the former with the balance of the monomeric mixture consisting of the monomeric organic sulfonic acid compound.

The polymerization system that is employed for the preparation of the graft copolymers used in the present invention may consist of as much as 50 percent by weight of the monomers to be polymerized in the aqueous or other medium. The amount of polymerizable constituents that are provided in the copolymerization system may be influenced somewhat by the manner in which it is intended to incorporate the product in the synthetic polymer compositions in order to provide the compositions of the invention.

If, for example, it is intended to incorporate the graft copolymer products by blending into a fiber-forming composition prior to its fabrication into shaped articles, the graft copolymerization system may, if desired, contain about equal proportions by weight of the charged polymerizable constituents and the polymerization medium which preferably is miscible with and tolerable in the spinning solution solvent being used. In such cases, the graft copolymer product may ordinarily be obtained as an easily dispersed gel that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition, it may be desirable to effect the polymerization so as to directly form the polymerization system as a suitable applicating emulsion or suspension of the graft copolymeric product, or as a solution when sufficiently hydrophilic polyglycol constituents are present in the monomeric vinyl benzyl polyglycol ether employed. For such purposes, the polymerization system may be prepared to contain as little as 5 or 10 percent by weight of the polymerizable monomeric and polymeric ingredients. Preferably, if the graft copolymer is water-insoluble, such a polymerization may be conducted under the influence of vigorous agitation to facilitate preparation of an emulsified or thoroughly dispersed product. It may also be beneficial under such circumstances to incorporate a dispersant or emulsifying agent in the polymerization system to facilitate obtaining a stable and homogeneous emulsified product. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as have been demonstrated, the emulsified, graft copolymeric additaments may be impregnated into the fiber while it is in a swollen or gel condition, as an acrylonitrile polymer fiber in an aquagel condition, in order to obtain the desired copolymer-containing product. A dissolved, water-soluble product may be similarly impregnated.

In this connection, when it is desired to blend the graft copolymeric additament in a synthetic polymer fiber-forming solution prior to its extrusion, such as an aqueous saline acrylonitrile polymer solution, a water-insoluble graft copolymer may be physically reduced by comminution to a sufficiently fine state to permit its dispersion in spinnable condition throughout the blended spinning solution in the solvent if it is otherwise insoluble in the solvent. While this may be accomplished by diverse techniques, it is generally advantageous to comminute the graft copolymer in the presence of the non-dissolving solment, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous saline polyacrylonitrile solvent that is being employed is an aqueous solution of zinc chloride, or its equivalent that contains at least about 55 percent and preferably about 60 percent by weight of dissolved zinc chloride, it may be advantageous to comminute a water-insoluble graft copolymeric additament while it is in a mixture with the saline solvent solution that contains between about 5 and 10 percent by weight of the copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of a water-insoluble graft copolymeric additament in the acrylonitrile polymer solvent that is suitable for blending in the spinning solution of the acrylonitrile polymer to provide a spinnable composition may usually be obtained by milling the mixture of graft copolymeric additament and solvent for an extended period that may exceed 100 hours. The suspension that is thereby obtained may then be directly blended in the proper proportions with the acrylonitrile polymer spinning solution to provide a composition in accordance with the present invention.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the graft copolymeric additament are incorporated therein. An appreciable improvement in dye-receptivity, antistatic properties and stability may frequently be obtained when a quantity of the graft copolymeric additament that is as small as 2 (and even as low as 1 or less) percent by weight is employed. Advantageously, an amount between about 4 and 15 percent by weight of the copolymeric additament may thus be utilized in the composition. Greater advantages may often accrue when the amount of the copolymeric additament that is incorporated in the composition is in the neighborhood of 5–10 percent by weight, based on the weight of the composition.

As has been indicated, the graft copolymeric additaments may be incorporated in the acrylonitrile polymer compositions according to various techniques. Thus, for example, the copolymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or otherwise dispersing them in a suitable liquid medium. Or, the compositions may be provided in fiber-forming system by sequentially dispersing the polymers in any desired order in a suitable medium, as by incorporating the copolymeric additament in a prepared acrylonitrile polymer spinning solution, dope, or the like.

As is evident from the illustrative examples heretofore included, a highly advantageous technique for providing the compositions, particularly when acrylonitrile polymer fiber products are involved, is to apply or impregnate the graft copolymeric additament from an aqueous dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition for Rendering Polyacrylonitrile Readily Dyeable" having Serial No. 333,385 which was filed on January 26, 1953, now abandoned. Thus, an acrylonitrile polymer filamentary article that has been spun from an aqueous saline spinning solution may be conveniently passed, after its coagulation and while it is in an aquagel condition, through a water bath containing the dissolved graft copolymeric additament in order to impregnate the filament with the graft copolymer and provide a compositon and an article in accordance with the invention. In addition, in situ polymerization techniques may also be relied upon to provide the graft copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials.

It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole figure of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes. Such dyestuffs, by way of didactic illustrations, as Calcocid Alizarine Violet (Colour Index 61710, formerly Colour Index 1080), Sulfanthrene Red 3B (Colour Index Vat Violet 2), Amacel Scarlet GB (Colour Index Direct Red 1—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51, Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); various soluble vat dyestuffs; such acetate dyes as Celliton Fast Brown 3RA Extra CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High. Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a good resistance to crocking. In addition, the dyed products exhibit good washfastness and retain the dye-assisting graft copolymeric additament in a substantially permanent manner, despite repeated exposure and subjection to washing, laundering and dry cleaning treatments.

What is claimed is:

1. Graft copolymer comprising between about 20 and 80 percent by weight of (*a*) a monomeric vinyl benzyl polyglycol ether of the general formula:

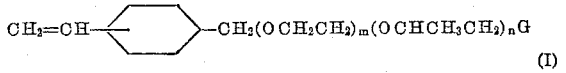

(I)

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; and (*b*) from 80 to 20 perecnt by weight of a vinyl lactam polymer.

2. The graft copolymer of claim 1, containing in the polymer molecule between about 30 and 50 percent by weight of said monomer graft copolymerized with the vinyl lactam polymer.

3. The graft copolymer of claim 1, wherein said vinyl lactam polymer with which said monomer is graft copolymerized is poly-N-vinylpyrrolidone.

4. Graft copolymer comprising between about 20 and 80 percent by weight of (*a*) a mixture of monomers consisting of from about 10 to 90 mole percent of (1) a vinyl benzyl polyglycol ether of the formula:

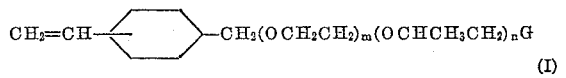

(I)

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; and (2) from about 90 to 10 mole percent of at least one monomeric, alkenyl group-containing organic sulfonic acid compound selected from the group consisting of those represented by the formulae:

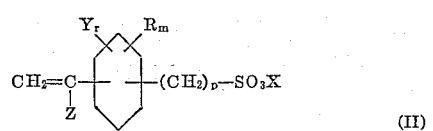

(II)

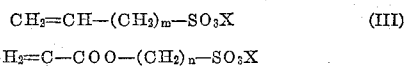

(III)

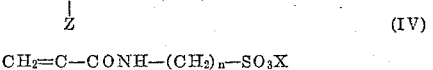

(IV)

$CH_2=C-CONH-(CH_2)_n-SO_3X$
|
Z (V)

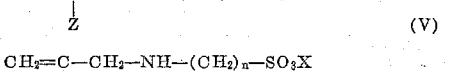

(VI)

all wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, m is an integer from 0 to 2; n is an integer from 1 to 2; p is an integer from 0 to 1; and r is an integer from 1 to 4; and (b) from about 80 to 20 percent by weight of a vinyl lactam polymer.

5. The graft copolymer of claim 4 containing in the polymer molecule between about 30 and 50 percent by weight of said mixed monomeric constituents graft copolymerized with the vinyl lactam polymer.

6. The graft copolymer of claim 5 wherein said mixture of monomers consists of from 30 to 60 mole percent of said vinyl benzyl polyglycol ether having the Formula I.

7. Method for the preparation of a graft copolymer which comprises polymerizing between about 20 and 80 percent by weight, based on the weight of the resulting graft copolymer, of a vinyl benzyl polyglycol ether having the formula:

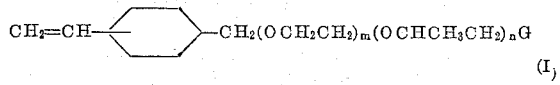

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; with between about 80 and 20 percent by weight of a vinyl lactam polymer.

8. Method for the preparation of a graft copolymer which comprises polymerizing between about 20 and 80 percent by weight, based on the weight of the resulting graft copolymer of (a) a mixture of monomers consisting of from about 10 to 90 mole percent of (1) a vinyl benzyl polyglycol ether of the formula:

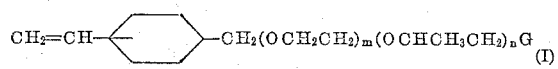

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; and (2) from about 90 to 10 mole percent of at least one alkenyl group-containing organic sulfonic acid compound selected from the group consisting of those having the formulae:

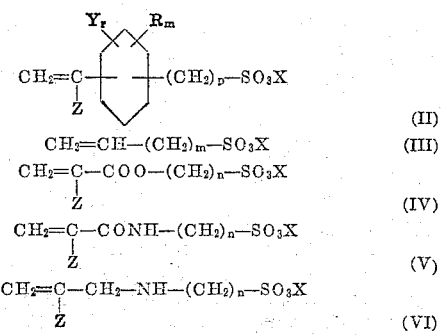

all wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, m is an integer from 0 to 2; n is an integer from 1 to 2; p is an integer from 0 to 1; and r is an integer from 1 to 4; with (b) between about 80 and 20 percent by weight of a vinyl lactam polymer.

9. Composition comprising a major proportion of (A) a fiber forming polymer of an ethylenically unsaturated monomeric material containing at least about 80 percent by weight of acrylonitrile and (B) a minor proportion of up to about 20 percent by weight, based on the weight of the composition, of a graft copolymer of (a) between about 20 and 80 weight percent of a vinyl benzyl polyglycol ether having the formula:

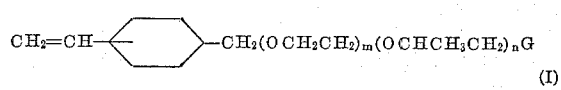

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; graft copolymerized with (b) from about 80 to 20 weight percent of a vinyl lactam polymer.

10. The composition of claim 9 containing between about 4 and 15 percent by weight, based on the weight of the composition, of said graft copolymer.

11. The composition of claim 9, wherein said graft copolymer contains about 50 percent by weight of said monomer graft copolymerized with said vinyl lactam polymer.

12. The composition of claim 9, wherein component (B) is a graft copolymer of 1-(2-methoxyethoxy)-(vinylbenzyloxy)-ethane grafted with poly-N-vinylpyrrolidone.

13. The composition of claim 9, wherein the acrylonitrile polymer is polyacrylonitrile.

14. The composition of claim 9, dispersed in a solvent for polyacrylonitrile.

15. A filamentary shaped article comprised of a composition that is set forth in claim 9.

16. Composition comprising a major proportion of (A) a fiber forming polymer of an ethylenically unsaturated monomeric material containing at least about 80 percent by weight of acrylonitrile and (B) a minor proportion of up to about 20 percent by weight, based on the weight of the composition, of a graft copolymer of (a) between about 20 and 80 weight percent of a mixture of monomers consisting of (1) from about 10 to 90 mole percent of a vinyl benzyl polyglycol ether of the formula:

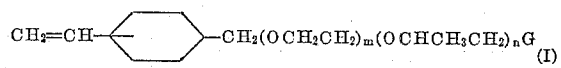

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; and (2) from about 90 to 10 mole percent of at least one alkenyl group-containing organic sulfonic acid compound selected from at least one member of the group consisting of those having the formulae:

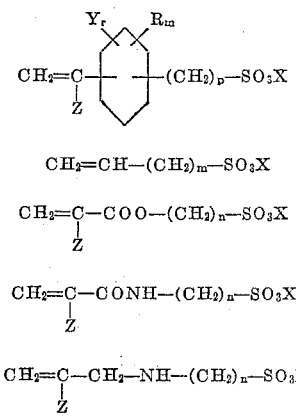

all wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 80 to 20 weight percent of a vinyl lactam polymer.

17. The composition of claim 16 containing between about 4 and 15 percent by weight, based on the weight of the composition, of said graft copolymer.

18. The composition of claim 16, wherein said graft copolymer contains about 50 percent by weight of said mixture of monomers graft copolymerized with said vinyl lactam polymer.

19. The composition of claim 16, wherein said mixture of monomers consists of from about 30 to 70 mole percent of said vinyl benzyl polyglycol ether of the Formula I.

20. The composition of claim 16, wherein component (B) is a graft copolymer of 1-(2-methoxyethoxy)-2-(vinylbenzyloxy)ethane with sodium styrene sulfonate graft copolymerized with poly-N-vinylpyrrolidone.

21. The composition of claim 16, wherein the acrylonitrile polymer is polyacrylonitrile.

22. The composition of claim 16, dispersed in a solvent for polyacrylonitrile.

23. A filamentary shaped article comprised of a composition that is set forth in claim 16.

24. Method for the preparation of a dye-receptive, antistatic, stable to light and heat, synthetic, linear hydrophobic polymer composition which comprises immersing an aquagel of a fiber forming polymer of an ethylenically unsaturated monomeric material containing at least about 80 percent by weight of acrylonitrile in the form of a shaped article into a dispersion of a graft copolymer of (a) between about 20 and 80 weight percent of a vinyl benzyl polyglycol ether of the formula:

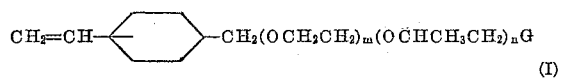

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; and (b) from about 80 to 20 weight percent of a vinyl lactam polymer, until between about 2 and 20 percent by weight of said graft copolymer, based on the weight of the resulting dry composition weight, is incorporated in said aquagel; and drying said graft copolymer-containing aquagel to convert it from the aquagel condition to a finished shaped article form.

25. The method of claim 24, wherein said acrylonitrile polymer is polyacrylonitrile.

26. Method for the preparation of a dye-receptive, antistatic, stable to light and heat, synthetic, linear, hydrophobic polymer composition which comprises immersing an aquagel of a fiber forming polymer of an ethylenically unsaturated monomeric material containing at least about 80 percent by weight of acrylonitrile in the form of a shaped article into a dispersion of a graft copolymer of (a) between about 20 and 80 weight percent of a mixture of monomers consisting of (1) from about 10 to 90 mole percent of a vinyl benzyl polyglycol ether of the formula:

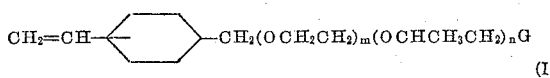

wherein G is selected from the group consisting of alkoxy radicals containing from 1 to about 8 carbon atoms; thioalkyl radicals containing from 1 to about 8 carbon atoms and halogens of atomic number 17 to 53; $m$ has an average value from about 2 to about 40; $n$ has an average value of from 0 to about 20 with the limitation that the value of $n$ is always less than that of $m$ and the sum total of $m$ plus $n$ is from about 2 to about 40; and (2) from about 90 to 10 mole percent of at least one alkenyl group-containing organic sulfonic acid compound selected from the group consisting of those having the formulae:

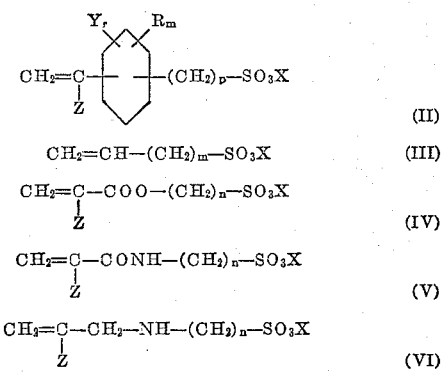

all wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4; and (b) from about 80 to 20 weight percent of a vinyl lactam polymer, until between about 2 and 20 percent by weight of said graft copolymer, based on the weight of the resulting dry composition weight, is incorporated in said aquagel; and drying said graft copolymer-containing aquagel to convert it from the aquagel condition to a finished shaped article form.

27. The method of claim 26, wherein said graft copolymer contains about 50 percent by weight of said mixture of monomers graft copolymerized with said vinyl lactam polymer and wherein said monomer mixture contains from about 30 to 70 mole percent of said vinyl benzyl polyglycol ether of the Formula I.

28. The method of claim 26, wherein said acrylonitrile polymer is polyacrylonitrile.

References Cited in the file of this patent

UNITED STATES PATENTS

| | | |
|---|---|---|
| 2,417,312 | MacGregor | Mar. 11, 1947 |
| 2,418,696 | Cameron et al. | Aug. 8, 1947 |
| 2,614,289 | Cresswell et al. | Oct. 21, 1952 |
| 2,643,990 | Ham | June 30, 1953 |
| 2,735,831 | Coover | Feb. 21, 1956 |
| 2,776,270 | Coover et al. | Jan. 1, 1957 |
| 2,776,271 | Coover et al. | Jan. 1, 1957 |
| 2,790,783 | Coover | Apr. 30, 1957 |
| 2,821,519 | Glickman | Jan. 28, 1958 |
| 2,837,496 | Vandenberg | June 3, 1958 |
| 2,861,101 | Tousignant et al. | Nov. 18, 1958 |

FOREIGN PATENTS

| | | |
|---|---|---|
| 715,194 | Great Britain | Sept. 8, 1954 |